(12) United States Patent
Kreitzer et al.

(10) Patent No.: US 7,849,970 B2
(45) Date of Patent: Dec. 14, 2010

(54) METHOD FOR MAINTAINING A VERTICAL MOTOR THRUST BEARING

(75) Inventors: Scott Kreitzer, Maineville, OH (US); Mark Hodowanec, Leesburg, VA (US); Warren G. Holter, Cincinnati, OH (US); Jason Obermeyer, Hamilton, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 1437 days.

(21) Appl. No.: 11/214,330

(22) Filed: Aug. 29, 2005

(65) Prior Publication Data

US 2006/0093248 A1 May 4, 2006

Related U.S. Application Data

(60) Provisional application No. 60/605,773, filed on Aug. 31, 2004.

(51) Int. Cl.
*F01N 1/00* (2006.01)
*F16C 37/00* (2006.01)

(52) U.S. Cl. .................. 184/100; 184/6.17; 384/313

(58) Field of Classification Search .............. 184/100; 384/313; 417/367; 165/158, 177
See application file for complete search history.

(56) References Cited

U.S. PATENT DOCUMENTS

| | | | | |
|---|---|---|---|---|
| 2,556,435 | A * | 6/1951 | Moehrl et al. ............... | 417/367 |
| 3,220,786 | A | 11/1965 | McCuthchen | |
| 3,700,293 | A * | 10/1972 | Dray ........................... | 384/125 |
| 3,817,586 | A * | 6/1974 | Elwell ......................... | 384/306 |
| 3,862,588 | A * | 1/1975 | Bahrle et al. ................. | 91/486 |
| 3,924,712 | A * | 12/1975 | Stirling et al. ........... | 188/264 F |
| 3,954,309 | A * | 5/1976 | Hutson et al. ............... | 384/114 |
| 4,270,064 | A | 5/1981 | Glandorf | |
| 4,398,778 | A | 8/1983 | Kraus ......................... | 308/235 |
| 4,958,940 | A | 9/1990 | Morrill | |
| 4,966,230 | A * | 10/1990 | Hughes et al. .............. | 165/150 |
| 5,323,849 | A * | 6/1994 | Korczynski et al. ......... | 165/158 |
| 5,516,212 | A | 5/1996 | Titcomb ..................... | 384/107 |
| 6,139,295 | A | 10/2000 | Utter | |
| 6,588,933 | B2 | 7/2003 | Ferguson | |
| 6,748,906 | B1 * | 6/2004 | White et al. ............. | 123/41.01 |

(Continued)

FOREIGN PATENT DOCUMENTS

EP 58077920 5/1983

(Continued)

OTHER PUBLICATIONS

Translation Branch, United States Patent and Trademark Office, PTO 2010-3216, Translation of Japanese Unexamined Patent Publication S5877920, Apr. 12, 2010.*

(Continued)

*Primary Examiner*—Michael R Mansen
*Assistant Examiner*—Robert T Reese
(74) *Attorney, Agent, or Firm*—Filip A. Kowalewski

(57) ABSTRACT

Certain exemplary embodiments comprise a system for cooling bearing of a shaft of a motor, comprising: an oil sump adapted to collect oil that contacts a bearing enclosed within the sump; and a heat exchanger physically separated from the sump and the bearing, the heat exchanger adapted to be in fluid communication with the sump and the bearing.

21 Claims, 4 Drawing Sheets

U.S. PATENT DOCUMENTS

2009/0008074 A1* 1/2009 Vamvakitis et al. ......... 165/177

FOREIGN PATENT DOCUMENTS

| EP | 59006421 | 1/1984 |
|---|---|---|
| EP | 59169349 | 9/1984 |
| EP | 09014277 | 1/1997 |
| JP | 58077920 | * 11/1983 |

OTHER PUBLICATIONS

PCT International Search Report—mailed Jan. 4, 2006.
Kingsbury, "A General Guide to the Principles, Operation, and Troubleshooting of Hydrodynamic Bearings", Aug. 1, 1997, 27 pages, Kingsbury, Inc.

* cited by examiner

3000

3200  3300  3100

4000

4200  4100  4300

METHOD FOR MAINTAINING A VERTICAL MOTOR THRUST BEARING

CROSS-REFERENCES TO RELATED APPLICATIONS

This application claims priority to, and incorporates by reference herein in its entirety, pending U.S. Provisional Patent Application Ser. No. 60/605,773, filed 31 Aug. 2004.

BACKGROUND

In a vertical-shaft motor, bearings typically carry the thrust load generated by an external device. The bearings can utilize lubrication to prevent over-heating, protect the bearings from corrosion, and/or avoid excessive wear of the bearings. The temperature of oil provided in the lubrication system can increase upon receiving the heat generated by the rotating bearings. To effectively lubricate the bearings it can be necessary to cool the oil. Conventional systems typically utilize a water cooler system to cool the bearings which rotate within a sump.

Such a water cooler system can require a cool, clean water source, which can be a significant expense. Such a system can comprise a reservoir, heat exchanger, pump to circulate the water system, and/or filtering. In addition, there is the risk of potential leaks which could contaminate the oil, and potentially lead to ineffective lubrication of the bearings and bearing failure.

SUMMARY

Certain exemplary embodiments can provide, for a vertical-shaft motor having an axial thrust bearing (e.g., a tilting-pad (Kingsbury-style), babbitted fluid film, hydrodynamic, rolling contact, ball, roller, and/or tapered roller, etc., thrust bearing), a bearing cooling system that can comprise:
- an enclosed bearing housing and/or oil sump for continuously collecting oil that flows over and/or through a thrust bearing contained therein;
- a oil-to-air tubular heat exchanger that is separated from the sump and bearing, and that continuously transfers heat in the oil to that air circulating over and/or between tubes of the heat exchanger;
- a shaft-mounted fan for continuously circulating air over and/or through the heat exchanger, the fan external to and/or physically separated from the sump;
- a shaft-mounted oil pump for displacing and continuously circulating oil from the sump to and/or across the bearing, to and/or through the heat exchanger, and back to the sump; and/or
- connecting tubing and/or channels to provide an enclosed oil flow path, thereby substantially protecting the oil from any potential debris in the air;

Certain exemplary embodiments can provide:
- a static-shaft oil level that substantially covers the bearings to reduce corrosion and/or oxidation of the bearing surfaces;
- a dynamic shaft oil level that substantially uncovers the bearings to reduce hydrodynamic drag that can lead to excess heat generation;
- a directed and/or predetermined oil flow path; and/or
- optimal and/or minimal pressure drop in the oil flow path.

Certain exemplary embodiments can avoid:
- the need for and/or cost of obtaining clean water;
- the need for and/or cost of obtaining cool water and/or cooling the heated water;
- the potential for leaks between the water and oil; and/or
- the potential for bearing failure due to water entrainment in the oil.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
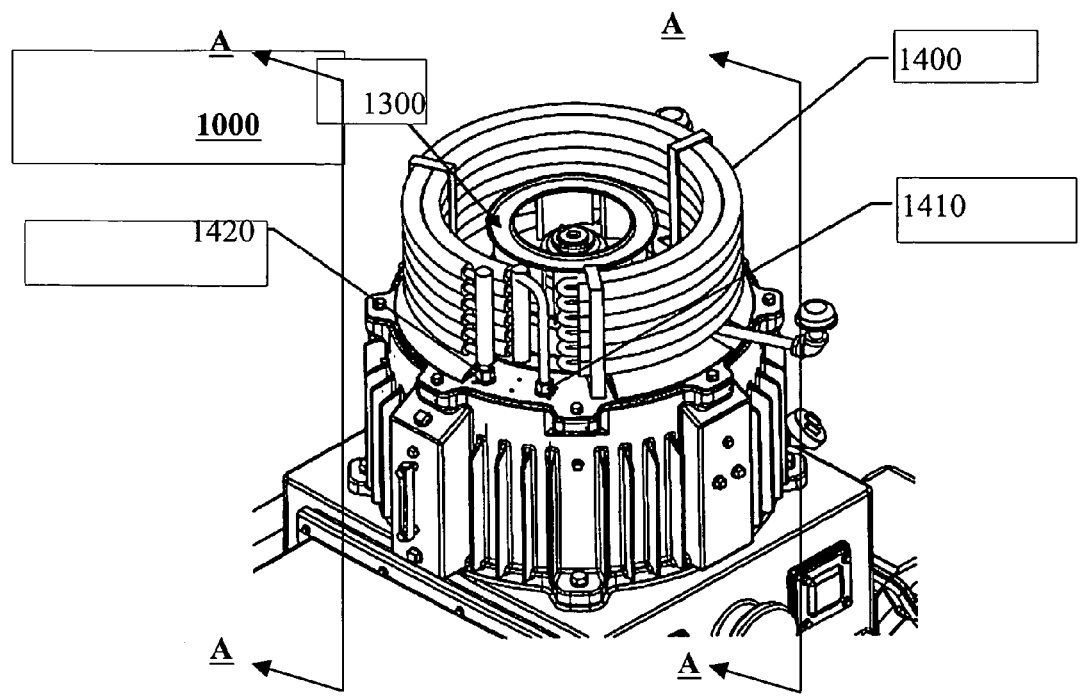
FIG. 1 is a perspective view of an exemplary embodiment of a system 1000.

When the following terms are used substantively herein, the accompanying definitions apply:

a—at least one.

activity—an action, act, step, and/or process or portion thereof.

adapted to—made suitable or fit for a specific use or situation.

and/or—either in conjunction with or in alternative to.

apparatus—an appliance or device for a particular purpose.

automatically—acting or operating in a manner essentially independent of external influence or control. For example, an automatic light switch can turn on upon "seeing" a person in its view, without the person manually operating the light switch.

axial thrust—a force parallel to a longitudinal axis of a shaft.

bearing—a device that supports, guides, and reduces the friction of motion between fixed and moving machine parts.

can—is capable of, in at least some embodiments.

circulate—to move in or flow through a circuit and/or to move about.

collect—to accumulate and/or gather.

component—a constituent element and/or part.

comprising—including but not limited to.

contact—to touch, such as by flowing across and/or within.

continuously—in a manner uninterrupted in time, sequence, substance, and/or extent.

convey—to take, carry, and/or guide from one place to another.

cool—to make less warm, to remove heat from, and/or to reduce the molecular and/or kinetic energy of.

cover—to overlay, place upon and/or over, and/or immerse.

define—to establish the outline, form, and/or structure of.

device—a machine, manufacture, and/or collection thereof.

drive—to supply the motive force or power to and/or to cause and/or force to move and/or function.

dynamic shaft—the vertical shaft when rotating.

enclosed within—surrounded by.

external—relating to, existing on, and/or connected with the outside or an outer part; exterior.

fan—a device for creating a flow of a vapor via the rotational movement of typically thin, rigid vanes.

flow path—a route along which a fluid can be conveyed.

fluid communication—connected via a flow-path that can be traversed by a liquid and/or vapor.

hydrodynamic bearing—a bearing that functions via rotation of the bearing sweeping a fluid into the bearing, forming a lubricating wedge under and/or around the bearing and/or shaft.

hydrostatic bearing—a bearing that functions via a fluid pumped into the bearing through an orifice an/or a porous material.

Kingsbury-style bearing—a type of tilting-pad bearing.

level—a position along a vertical axis indicating height and/or depth.

may—is allowed to, in at least some embodiments.

method—a process, procedure, and/or collection of related activities for accomplishing something.

motor—a device that converts electrical energy into mechanical energy.

mount—to couple and/or attach to.

oil—any of numerous mineral, vegetable, and/or synthetic substances and/or animal and/or vegetable fats that are generally slippery, combustible, viscous, liquid or liquefiable at room temperatures, soluble in various organic solvents such as ether but typically not in water, and used as a lubricant.

oil-to-air heat exchanger—a device used to transfer heat from oil on one side of a barrier to air on the other side without bringing the oil and air into direct contact with each other.

operate—to perform a function and/or to work.

operative embodiment—an implementation that is in operation and/or is working as designed.

physically separated—spaced apart.

plurality—the state of being plural and/or more than one.

predetermined—established in advance.

prevent—to impede, hinder, stop, and/or keep from happening.

provide—to furnish, supply, and/or make available.

pump—a machine or device for raising, compressing, and/or transferring one or more fluids.

repeatedly—again and again; repetitively.

retaining ring—an annular device adapted to restrain and/or guide the bearing.

rolling contact bearing—a bearing that carries a load by placing round elements between the bearing races. Types of rolling contact bearings include ball, cylindrical roller, and tapered roller bearings.

set—a related plurality.

shaft—a long, generally cylindrical bar that rotates and transmits power.

static shaft—the vertical shaft when not rotating.

substantially—to a great extent or degree.

sump—a low lying reservoir.

system—a collection of mechanisms, devices, data, and/or instructions, the collection designed to perform one or more specific functions.

through—in one side and out the opposite or another side of, across, among, and/or between.

tilting-pad bearing—a bearing having pivotable "shoes" or "pads" that, when in operation, receive oil provided by the rotating part of the bearing. The fluid pressure of the oil causes the pad to tilt slightly, building a wedge of pressurized fluid between the pad and the other bearing surface. The degree of pad tilt adaptively changes with bearing load and speed.

tubing—a long hollow conduit adapted to hold and/or convey a solid and/or fluid.

tubular heat exchanger—a device used to transfer heat from a fluid on one side of a set of tubes to a fluid on the other side of the set of tubes without bringing the fluids into direct contact.

vertical shaft—a shaft adapted to be operated when the longitudinal axis of the shaft is upright and/or oriented at substantially a right angle to the horizon.

via—by way of and/or utilizing.

DETAILED DESCRIPTION

Certain exemplary embodiments comprise a system for cooling bearing of a shaft of a motor, comprising: an oil sump adapted to collect oil that contacts a bearing enclosed within the sump; and a heat exchanger physically separated from the sump and the bearing, the heat exchanger adapted to be in fluid communication with the sump and the bearing.

Figure 2:
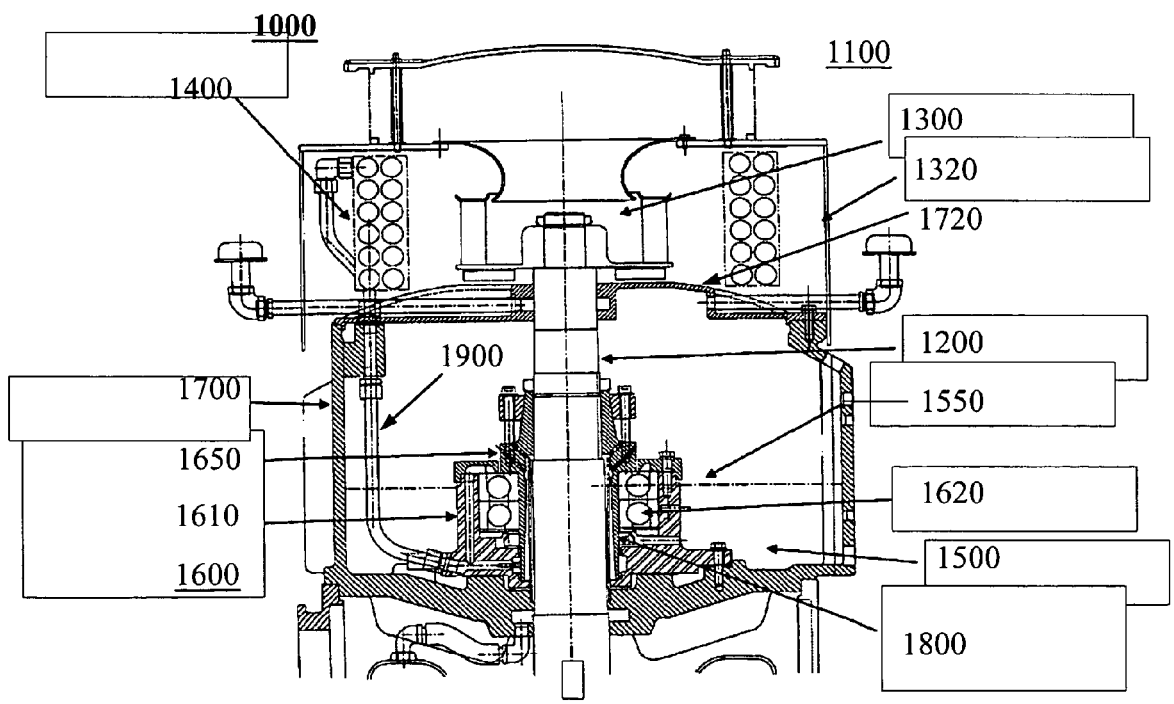
FIG. 2 is a cross-sectional view taken at plane A-A of an exemplary embodiment of system 1000.

FIG. 1 is a perspective view of, and FIG. 2 is a cross-sectional view taken at plane A-A of, an exemplary embodiment of system 1000 which can be used for cooling a bearing, such as an axial thrust bearing 1600 of a shaft, such as a vertical shaft 1200, of a motor 1100. Bearing 1600 can be a tilting-pad (Kingsbury-style), babbitted fluid film, hydrodynamic, rolling contact, ball, roller, and/or tapered roller, etc., thrust bearing.

Coupled to, mounted on, and/or driven by shaft 1200 can be a fan 1300, that can be adapted to continuously provide air-to-oil cooler and/or heat exchanger 1400, which can be located external to, above, and/or physically separate from, an oil sump 1500 and/or a bearing housing 1700. Any oil within sump 1500 and/or bearing housing 1700 can be physically separated, segregated, isolated, and/or protected from heat exchanger 1400, air circulating over, around, and/or through heat exchanger 1400, and/or any debris contained and/or entrained in the circulating air, by a housing cover 1720.

Fan 1300 can be at least partially surrounded and/or enclosed by a fan housing 1320 (not shown in FIG. 1), which can help direct air circulated by fan 1300 over, around, and/or through the coils of heat exchanger 1400.

Bearing 1600 can be mounted on and/or secure shaft 1200. Bearing 1600 can be located within bearing housing 1700, which can contain sump 1500. Thus, bearing housing 1700 and/or sump 1500 can surround and/or enclose bearing 1600. A thrust block 1650 can transfer an axial thrust load and/or forces to bearing 1600, which can comprise a bearing capsule 1610 that contains and/or at least partially surrounds thrust bearings 1620. A retaining ring (not shown) can pump oil away from the bearing, which can allow a predefined amount of oil to be sprayed on the bearing through an aperture in the bearing capsule, which can be located adjacent to the bearing housing.

When the motor is energized and/or rotating, pressure generated by an oil pump, such as a shaft mounted, driven, and/or secured oil pump 1800, can cause oil to continuously flow, circulate, and/or be conveyed away from and/or to sump 1500, to, into, across, through, and/or away from bearing 1600, through tubing 1900, to and/or through heat exchanger inlet 1410, to and/or through the coils of heat exchanger 1400, to and/or through heat exchanger outlet 1420, and/or back to sump 1500. In various embodiments, oil pump 1800 can be adapted to be operated by either a clockwise or a counter-clockwise rotation of the shaft 1200.

When shaft 1200 is not rotating and/or static, a static shaft oil level 1550 in sump 1500 can cover thrust bearings 1620 and/or bearing 1600, which can protect the surface condition of the bearing and/or substantially reduce oxidation, rusting, and/or corrosion of the active surface of the bearing. When shaft 1200 is rotating and/or dynamic, a dynamic shaft oil level 1550 in sump 1500 can uncover thrust bearings 1620 and/or bearing 1600.

Figure 3:
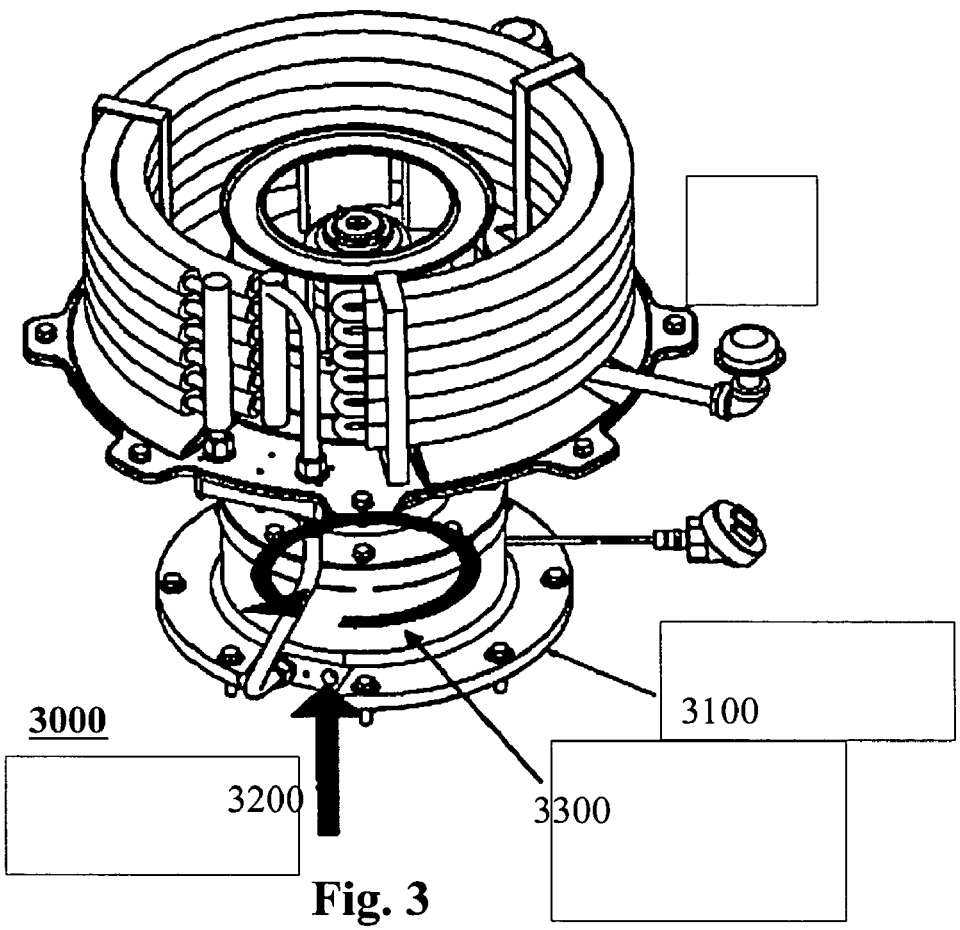
FIG. 3 illustrates an exemplary embodiment of an oil flow path 3000.
Figure 4:
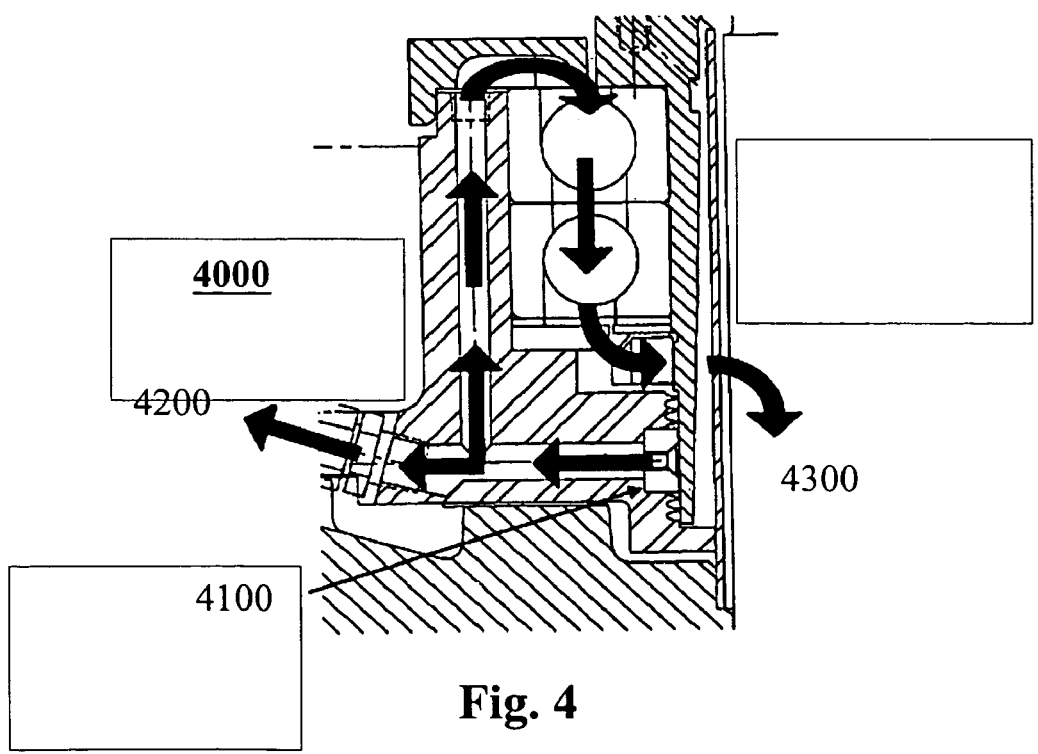
FIG. 4 illustrates an exemplary embodiment of an oil flow path 4000.
Figure 5:
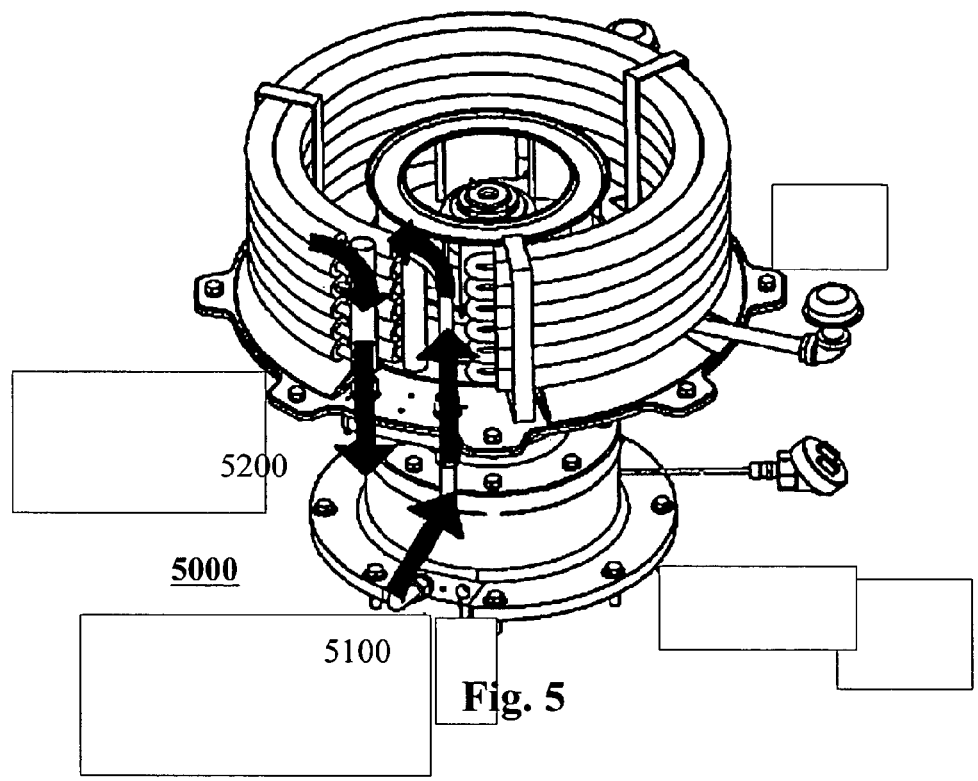
FIG. 5 illustrates an exemplary embodiment of an oil flow path 5000.

FIGS. 3, 4, and 5 illustrate an exemplary embodiment of oil flow paths 3000, 4000, and 5000 respectively. As shown in FIG. 3, oil can enter the bearing capsule 3100 from the oil sump via flow path 3200. Oil can travel in a circumferential flow path 3300 in the same direction as the pump. As shown in FIG. 4, the oil can travel through an internal groove in the bearing capsule to form flow path 4100. As shown by flow path 4200, most of the oil can be pumped out of the bearing capsule and to the heat exchanger. As shown by flow path 4300, a small part of the oil can be pumped through the bearing and then back to the oil sump. As shown in FIG. 5, oil can enter the heat exchanger from the bearing capsule through a connecting tube via flow path 5100. The cooled oil can then flow along flow path 5200 back into the oil sump. Thus, via predetermined, directed, and/or enclosed flow paths 3000, 4000, and/or 5000, the heat exchanger can be in fluid communication with the sump, oil pump, and/or bearing.

Figure 6:
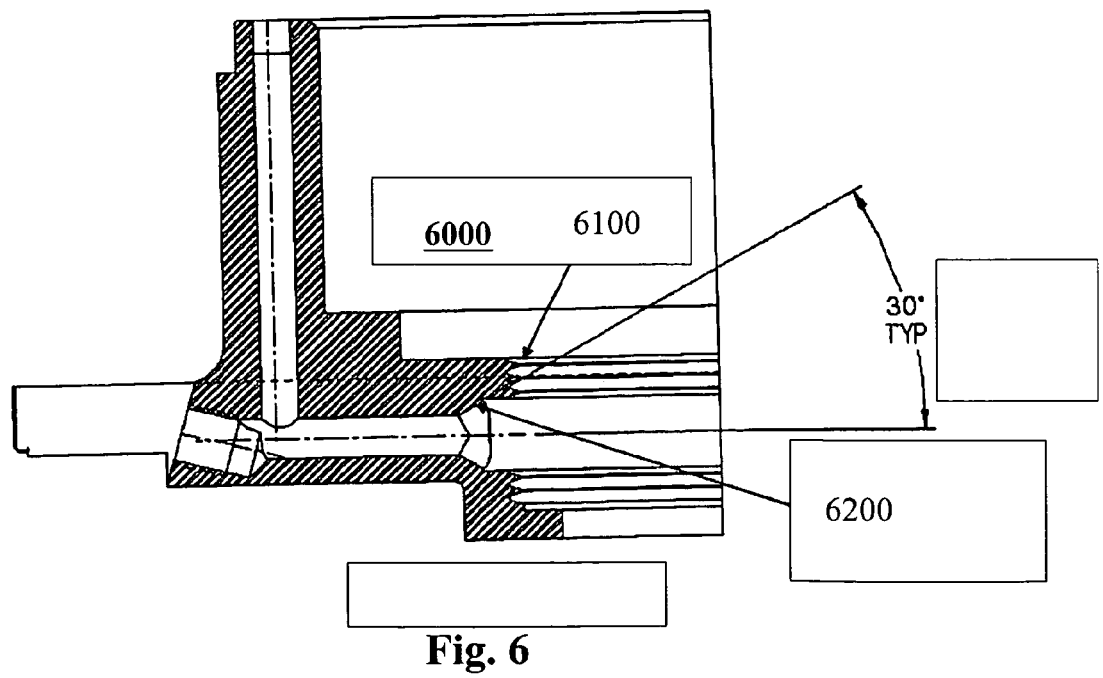
FIG. 6 illustrates an exemplary embodiment of an oil flow path 6000.

FIG. 6 illustrates an exemplary embodiment of an oil flow path 6000 through a bearing capsule at a pump area. Labyrinth teeth 6100 can help minimize oil pump leakage. A tapered inlet 6200 can help minimize oil pressure drop. The taper of inlet 6200 can be approximately 30 degrees, which can be applied to the top of the inlet, the bottom of the inlet, the sides of the inlet, all around the inlet, and/or only the top and bottom of the inlet.

Figure 7:
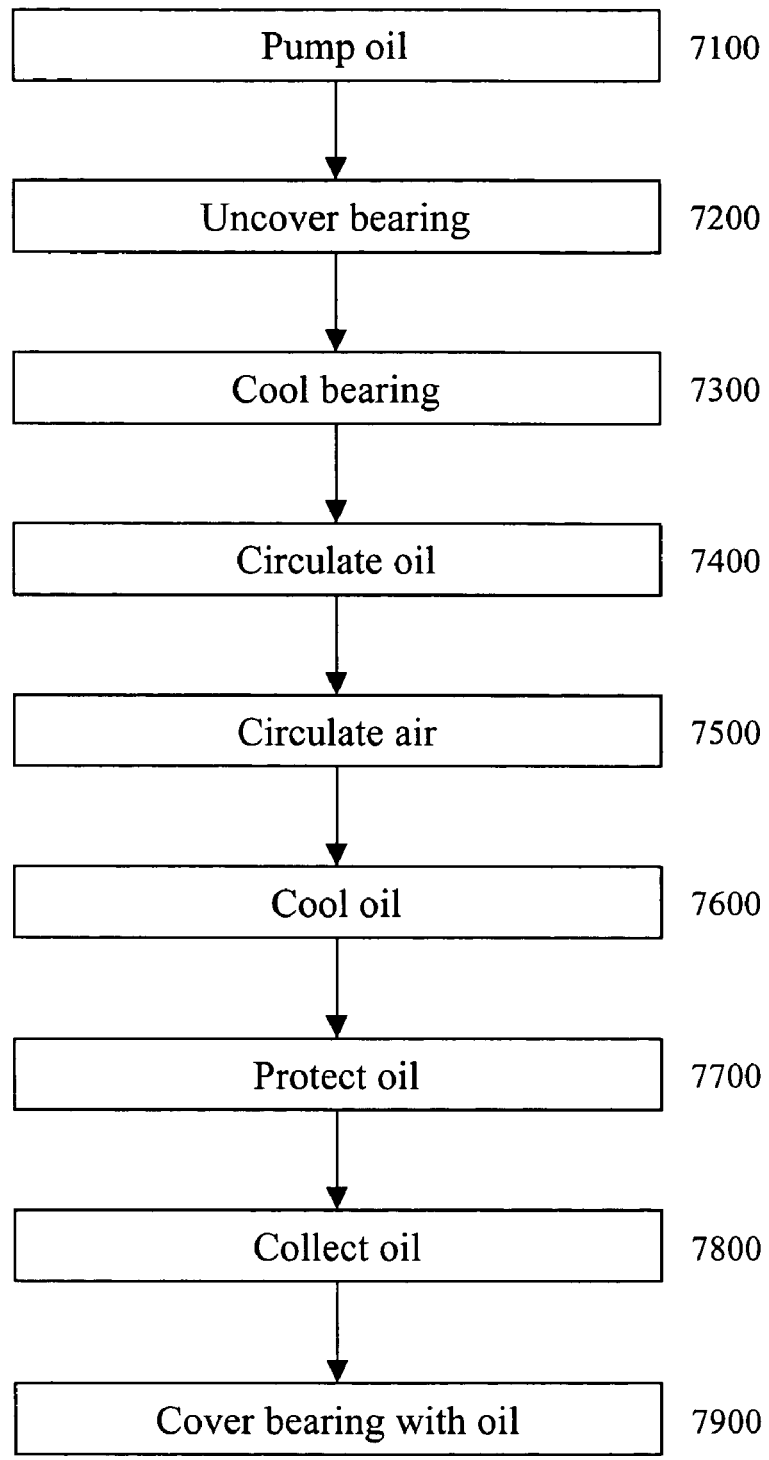
FIG. 7 is a flowchart of an exemplary embodiment of a method 7000.

FIG. 7 is a flowchart of an exemplary embodiment of a method 7000. At activity 7100, upon start-up of the motor, at least a portion of oil can be pump out of the sump, such as via a shaft-mounted oil pump. At activity 7200, as oil is pumped out of the sump, the oil level can drop sufficiently for the bearing to be substantially uncovered, thereby potentially reducing viscous drag on the bearing. At activity 7300, at least a portion of the oil can flow in, through, and/or around the bearing to cool the bearing. At activity 7400, at least a portion of the oil can circulate to and/or through a heat exchanger, such as a tubular heat exchanger, and/or an oil-to-air tubular heat exchanger. At activity 7500, air can be circulated in, through, around, across, and/or over the heat exchanger. At activity 7600, the circulating air can substantially cool at least a portion of the oil flowing through, around, and/or across the heat exchanger. At activity 7700, the oil can be protected from the circulating air, ambient air, and/or debris in the air, such as via tubing, an enclosed bearing housing, and/or a cover separating the heat exchanger from the sump and/or bearing housing. At activity 7800, at least a portion of the oil can be collected in the sump to re-start the circulation cycle. At activity 7900, upon shut-down of the motor, the oil level in the sump can rise sufficiently to cover the bearing, thereby protecting the bearing from corrosion and/or exposure to air.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for cooling an axial thrust bearing of a vertical shaft of a motor, said method comprising a plurality of activities comprising:
   collecting oil that has contacted the axial thrust bearing in an oil sump that encloses the axial thrust bearing, the oil sump surrounding an upper region of the vertical shaft;
   pressurizing a portion of the collected oil with a pump having a pump outlet with a first and second branch;
   directing a portion of the pressurized oil from the pump outlet through said first branch to an oil-to-air tubular heat exchanger that is physically separated from the sump and the axial thrust bearing wherein the heat exchanger is in fluid communication with the sump; and
   simultaneously directing another portion of the pressurized oil from the pump outlet through said second branch to the axial thrust bearing.

2. The method of claim 1, further comprising:
   providing a static shaft oil level that covers the bearing.

3. The method of claim 1, further comprising:
   providing a dynamic shaft oil level that uncovers the bearing.

4. The method of claim 1, further comprising:
   pumping the oil from the sump to a bearing capsule retaining the bearing that is in fluid communication with the pump outlet.

5. The method of claim 1, further comprising:
   pumping the oil from the sump to the bearing via an oil pump driven by the vertical shaft.

6. The method of claim 1, further comprising:
   pumping the oil from the sump to the bearing via an oil pump mounted on the vertical shaft.

7. The method of claim 1, further comprising:
   pumping a portion of the pressurized oil away from a bearing capsule retaining the bearing that is in fluid communication with the pump outlet.

8. The method of claim 1, further comprising:
   pumping oil from the pump outlet to a bearing capsule retaining the bearing and in turn directing a portion of the oil from the bearing capsule to the oil-to-air tubular heat exchanger.

9. The method of claim 1, wherein:
oil is continuously circulated through the oil-to-air tubular heat exchanger.

10. The method of claim 1, wherein:
oil is continuously circulated to the bearing.

11. The method of claim 1, further comprising:
substantially protecting the oil from potential debris in air that contacts the oil-to-air tubular heat exchanger.

12. The method of claim 1, further comprising:
circulating air through the oil-to-air tubular heat exchanger.

13. The method of claim 1, further comprising:
continuously circulating air through the oil-to-air tubular heat exchanger.

14. The method of claim 1, further comprising:
circulating air through the oil-to-air tubular heat exchanger via a fan driven by the vertical shaft.

15. The method of claim 1, further comprising:
circulating air through the oil-to-air tubular heat exchanger via a fan mounted on the vertical shaft.

16. The method of claim 1, further comprising:
circulating air through the oil-to-air tubular heat exchanger via a fan located external to the sump.

17. The method of claim 1, wherein:
the bearing is a hydrodynamic bearing.

18. The method of claim 1, wherein:
the bearing is a tilting-pad bearing.

19. The method of claim 1, wherein:
the bearing is a Kingsbury-style bearing.

20. The method of claim 1, wherein:
the bearing is a rolling contact bearing.

21. A method for cooling an axial thrust bearing of a vertical shaft of a motor, wherein the axial thrust bearing is retained within a bearing capsule, said method comprising:
collecting oil that has contacted the axial thrust bearing in an oil sump that encloses the axial thrust bearing, the oil sump surrounding an upper region of the vertical shaft;
pressurizing a portion of the collected oil with a pump having an outlet that is coupled to the bearing capsule;
directing the pressurized oil from the pump through the bearing capsule;
separating the pressurized oil into portions;
circulating a first portion of the pressurized oil within the bearing capsule to the thrust bearing; and
simultaneously circulating a second portion of the pressurized oil from the bearing capsule to an oil-to-air heat exchanger that is physically separated from the sump and the bearing capsule, to the sump.

* * * * *